US012449098B2

(12) United States Patent
Lechthaler et al.

(10) Patent No.: US 12,449,098 B2
(45) Date of Patent: Oct. 21, 2025

(54) TRANSPORTABLE FILLING STATION FOR PRESSURIZED FLUIDS

(71) Applicant: Wolftank-Adisa Holding AG, Innsbruck (AT)

(72) Inventors: Markus Lechthaler, Bozen (IT); Joerg Neugaertner, Regensburg (DE); Peter Werth, Eppan an der Weinstrasse (IT)

(73) Assignee: Wolftank-Adisa Holding AG, Innsbruck (AT)

( * ) Notice: Subject to any disclaimer, the term of this patent is extended or adjusted under 35 U.S.C. 154(b) by 76 days.

(21) Appl. No.: 18/516,136

(22) Filed: Nov. 21, 2023

(65) Prior Publication Data

US 2024/0167632 A1 May 23, 2024

(30) Foreign Application Priority Data

Nov. 22, 2022 (AT) .............................. A 50882/2022

(51) Int. Cl.
*F17C 13/00* (2006.01)
*F17C 5/02* (2006.01)

(52) U.S. Cl.
CPC .............. *F17C 13/002* (2013.01); *F17C 5/02* (2013.01)

(58) Field of Classification Search
CPC .............. F17C 5/007; F17C 2270/0168; F17C 2265/065; F17C 2250/0439; F17C 2250/043; F17C 2250/03; F17C 2221/012; F17C 2205/0332; F17C 2205/0326; F17C 2205/013; F17C 2205/0107; F17C 13/08
See application file for complete search history.

(56) References Cited

U.S. PATENT DOCUMENTS 5,350,442 A 9/1994 Thelen et al.
6,039,123 A * 3/2000 Webb ........................ B67D 7/78 141/82
6,732,769 B2 * 5/2004 Del Campo ............. A62C 3/00 141/82

(Continued)

FOREIGN PATENT DOCUMENTS

AT 509477 A4 9/2011
WO 2020/161159 A1 8/2020

OTHER PUBLICATIONS

Extended European Search Report received for European Patent Application No. 23203990.9, mailed on Mar. 26, 2024, 6 pages (official language copy only).

(Continued)

*Primary Examiner* — Timothy L Maust
(74) *Attorney, Agent, or Firm* — Weaver IP L.L.C.

(57) ABSTRACT

A transportable filling station for pressurized fluids comprises a container which can be placed on the ground. The container has a pressurized-fluid dispenser which can be connected to a pressurized fluid supply via fluid circuit components. The container includes a first support structure parallel to its rear side and a second support structure parallel to its front side. The support structures form a passage between them through which ambient air can flow freely via openings in the lateral sides of the container. At least one of the two support structures supports, facing the passage, the fluid circuit components and the second support structure supports, facing away from the passage, the dispenser.

10 Claims, 2 Drawing Sheets

(56) References Cited

U.S. PATENT DOCUMENTS

| | | | | |
|---|---|---|---|---|
| 8,069,885 | B2 * | 12/2011 | Kederer | F17C 5/007 62/48.1 |
| 9,377,164 | B2 | 6/2016 | Utal et al. | |
| 9,404,623 | B2 * | 8/2016 | Kapoor | F17C 13/083 |
| 9,482,388 | B2 * | 11/2016 | Murphy | F17C 5/06 |
| 9,689,532 | B2 * | 6/2017 | Barbato | F17C 5/06 |
| 2014/0130901 | A1 | 5/2014 | Moses et al. | |
| 2015/0020918 | A1 | 1/2015 | Macaluso et al. | |
| 2018/0229998 | A1 | 8/2018 | Shock | |

OTHER PUBLICATIONS

Office Action received for Austrian Patent Application No. A 50882/2022, mailed on May 10, 2023, 5 pages (2 pages of English Translation and 3 pages of Official Copy).

* cited by examiner

TRANSPORTABLE FILLING STATION FOR PRESSURIZED FLUIDS

CROSS-REFERENCE TO RELATED APPLICATIONS

This application claims priority to Austrian Patent Application No. A 50882/2022 filed Nov. 22, 2022, the disclosure of which is incorporated herein by reference.

TECHNICAL FIELD

The present disclosed subject matter relates to a transportable filling station for pressurized fluids, in particular hydrogen or liquefied natural gas.

BACKGROUND

Filling stations for hydrogen or liquefied natural gas (LNG) need to meet strict safety requirements for fire and explosion protection. For example, the European Union has enacted the ATEX Product and Operational Directives 2014/34/EU and 1999/92/EG, which must be complied with when operating such filling stations. This is particularly difficult when a filling station needs to be set up quickly on site, for example for the temporary supply of emergency vehicles in disaster relief, construction vehicles on building sites or in mining, or for refuelling means of public transport or in the military sector.

BRIEF SUMMARY

The aim of the disclosed subject matter is to provide a transportable filling station for pressurized fluids, which can be set up quickly on site and put into operation and which meets the strict safety requirements that apply to the handling of flammable gas mixtures.

This aim is achieved by a transportable filling station for pressurized fluids, which according to the disclosed subject matter is characterized by

- a first container which can be placed on the ground with a front side, a rear side, two lateral sides and a pressurized-fluid dispenser which can be connected to an external pressurized fluid supply via fluid circuit components that can be controlled by an electric control,
- wherein the first container includes a first support structure parallel to the rear side and a second support structure parallel to the front side,
- wherein the support structures form a passage between them through which ambient air can flow freely via openings in the lateral sides, and
- wherein at least one of the two support structures supports, facing the passage, the fluid circuit components and the second support structure supports, facing away from the passage, the dispenser.

The disclosed subject matter provides a containerized module for the rapid on-site construction of a filling station, which includes all of the fluid circuit components required for operating the filling station in a fire-protected and explosion-protected arrangement. The fluid circuit components face the central passage of the container. Any pressurized fluid vapours escaping from the fluid circuit components due to a defect or leaks during operation are diluted and vented to a non-hazardous, non-ignitable mixture by the ambient air flow in the passage. At the same time, the fluid circuit components in the passage are well protected but still easily accessible for maintenance and repair.

It is particularly advantageous when each lateral side has an opening which occupies the entire internal width of the passage opening out there, in order to maximize the ventilation of the passage and thus the safety of the filling station. Optionally, the openings are provided with barrier grilles to prevent unauthorized persons accessing the fluid circuit during operation.

In an optional embodiment of the disclosed subject matter, the first support structure is set back relative to the rear side into the interior of the container in order to form a first bay accessible from the rear for accommodating the electric control. In this way, the electric control is separated from the passage with the fluid circuit components, so that the risk of spark ignition is minimized, even in the event of a simultaneous failure in the electric control and leaks in the fluid circuit components.

Optionally, the first bay is closed to the first support structure by a separating wall, in order to create a mechanical barrier for vapours from the passage to the receiving bay for the electric circuit.

In a further optional embodiment of the disclosed subject matter, the second support structure is set back relative to the front side into the interior of the container to form a second bay accessible from the front side for accommodating the dispenser. With appropriate dimensioning, it can thus be achieved that the dispenser does not protrude over the front side of the container, so that it is well protected during the transport of the filling station.

Optionally, the second support structure can support, facing away from the passage, an electric control panel for operating the electric control and can support, facing the passage, auxiliary-fluid circuit components for the dispenser. The auxiliary-fluid circuit components are thus also exposed to the ambient air flow in the passage, so that any vapours escaping from them are diluted to a non-critical, non-ignitable level. The electrical control panel can be operated by the user directly next to the dispenser and, if the second support structure forms a receiving bay for the dispenser, is well protected in the bay as is the dispenser.

In a further aspect, the filling station according to the disclosed subject matter comprises an external pressurized fluid supply connected to the fluid circuit components in fluid communication, the external pressurized fluid supply comprising a storage module for pressurized fluid and a compressor module for compressing the pressurized fluid, wherein the compressor module is controlled by the electric control of the first container. The filling station thus consists of three modules which can be easily transported individually and assembled on site, namely the storage module, the compressor module, and the described first container as the particular module which combines all the electric and fluid circuit components for operating the filling station in a fireproof and explosion-proof manner.

To facilitate the transport the compressor module can be arranged in a second container which can be placed on the ground and/or the storage module can be arranged in a third container which can be placed on the ground or on a tank wagon.

BRIEF DESCRIPTION OF THE DRAWINGS/FIGURES

The disclosed subject matter will now be explained in more detail in the following with reference to an exemplary embodiment shown in the accompanying drawings. In the drawings.

DETAILED DESCRIPTION

Figure 1:
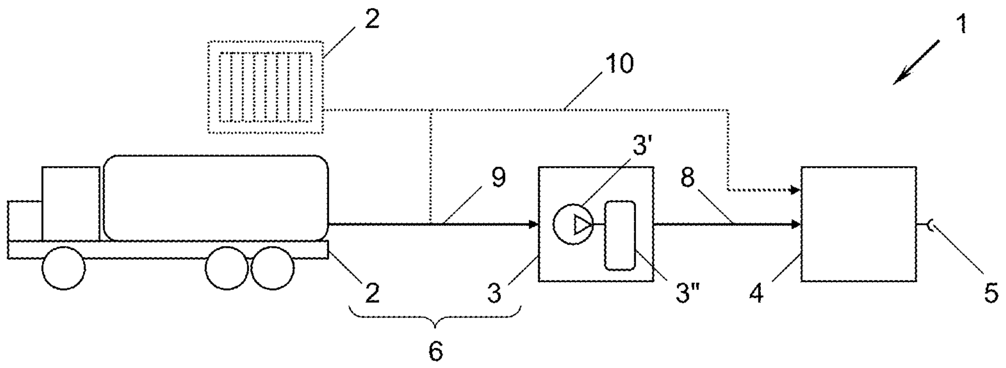
FIG. 1 shows the filling station of the disclosed subject matter in a schematic block diagram.

FIG. 1 shows a transportable filling station 1 for pressurized fluids such as hydrogen, liquefied natural gas (LNG) or the like. The filling station 1 is divided into individually transportable modules, namely a storage module 2 for pressurized fluid, an attached (optional) compressor module 3 for the pressurisation of the pressurized fluid, and a dispenser module 4 connected to the storage module 2 and/or the compressor module 3, which dispenser module serves as the actual dispenser 5 for refuelling a vehicle (not shown). The storage module 2 and the optional compressor module 3 form a pressurized fluid supply 6 for supplying the dispenser module 4.

The dispenser module 4 is configured in the form of a ("first") container 7 which can be placed on the ground, which will be explained in more detail below with reference to FIGS. 2 and 3. The optional compressor module 3 can also be configured in the form of a ("second") container which can be placed on the ground and contains corresponding compressors 3' for compressing the pressurized fluid and a high-pressure tank 3" for the interim storage of the high-pressure compressed pressurized fluid. The storage module 2 can be configured in turn as a ("third") container which can be placed on the ground, which contains for example a battery of compressed gas cylinders (indicated by dots). Alternatively, the storage module 2 can be arranged on a tanker, for example in the form of one or more pressurized containers or compressed gas cylinders. Corresponding connection lines 8-10 lead the pressurized fluid from the storage module 2 directly or via the compressor module 3 to the dispenser module 4.

Figure 2:
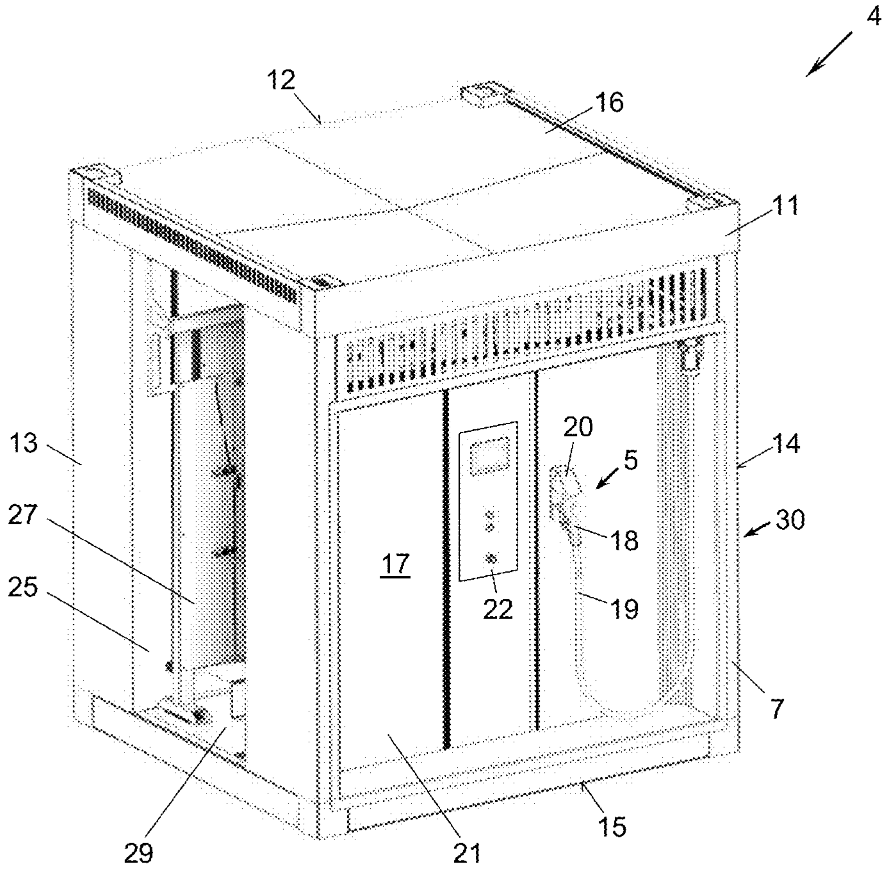
FIG. 2 shows the first container of the filling station of FIG. 1 in a perspective view.
Figure 3:
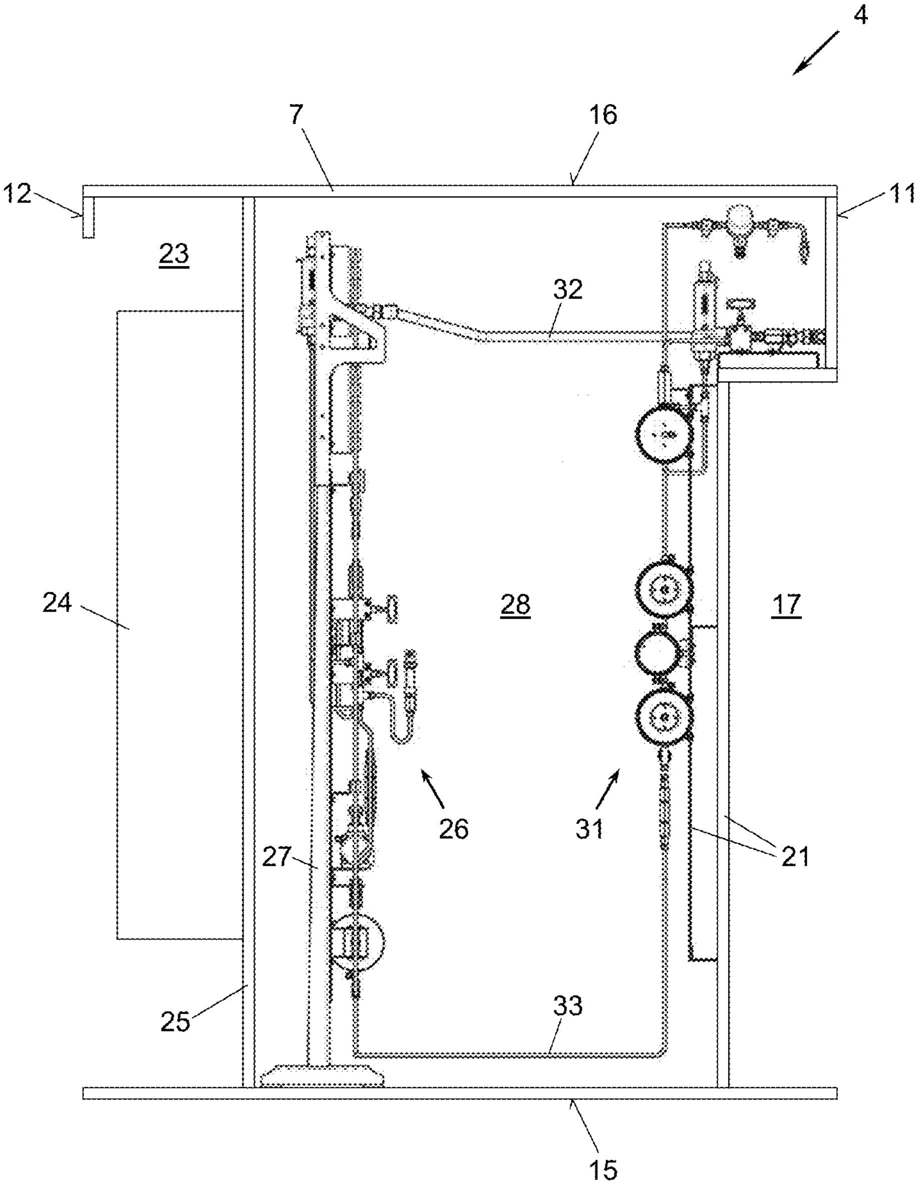
FIG. 3 shows a partly opened side view of the first container of FIG. 2.

According to FIGS. 2 and 3, the first container 7 forming the dispenser module 4 has a cube or cuboid shape with a front side 11, a rear side 12, two lateral sides 13, 14, a bottom side 15 and a top side 16. However, the container 7 could also have a different shape, e.g., polyhedral, prismatic, partially rounded etc., as long as it forms at least a front side 11, a rear side 12 and two opposite lateral sides 13, 14 for the purposes described here.

On the front side 11, more precisely in a bay 17 of the front side 11, the dispenser 5 is arranged in the form of a dispensing gun 18 with supply hose 19 and holder 20. The bottom ("bay bottom") of the bay 17 is formed by a wall-like support structure 21, which extends approximately parallel to the front side 11 and is set back into the interior of the container with respect to the front side 11 of the container 7. The support structure 21 supports, on the one hand, the dispenser 5 and, on the other hand, an electrical control panel 22 for the user to operate the dispenser module 4.

The rear side 12 of the container 7 has a further bay 23 for accommodating an electrical control 24 for the dispenser module 4 and optionally also for the compressor module 3 and/or the storage module 2. The bay bottom of the bay 23 is formed here by a separating wall 25 set back into the interior of the container with respect to the rear side 12.

All fluid circuit components 26 for the operation of the filling station 1 are accommodated in the interior of the container 7. The fluid circuit components 26 comprise all of the components which—beyond the pure connecting lines—are acted upon by pressurized fluid, such as stopcocks, controllable valves, pumps, thermometers, pressure gauges etc. The fluid circuit components 26 are mounted on a wall-like support structure 27, which runs parallel to the rear side 12 and is set back into the interior of the container with respect to the rear side 12 and (seen from the exterior) behind the separating wall 25.

Between the support structure 27 for the fluid circuit components 26 and the support structure 21 for the dispenser 5 a passage 28 is provided which can be entered by persons and which passes through the container 7 and thus opens to the open air on each lateral side 13, 14 via an opening 29, 30.

The openings 29, 30 can be formed by a plurality of apertures or, as in the shown example, by one large central aperture in the lateral sides 13, 14. In particular, each opening 29, 30 can occupy the entire internal width of the passage 28 opening out on the respective lateral side 13, 14, so that the passage 28 can be flowed through entirely freely by ambient air. Each opening 29, 30 can be provided with a barrier grille (not shown), to prevent unauthorized access to the passage 28.

The fluid circuit components 26 mounted on the support structure 27 facing the passage 28 are freely exposed to the ambient air convection flowing through the passage 28. The second support structure 21 can optionally support auxiliary-fluid circuit components 31 for the dispenser 5 on its side facing the passage 28 so that these are also freely exposed to the air convection in the passage 28.

Corresponding connecting lines 32, 33 can run in the container 7 between the fluid circuit components 26 and the auxiliary-fluid circuit components 31. Corresponding electrical connections between the control panel 22, the electric control 24 and the pressurized fluid supply 6 are not shown for simplicity.

In an exemplary embodiment, the container 7 is a standardized 20-foot container. The width of the passage 28, i.e., the distance between the facing sides of the support structures 27, 21 (without mounted fluid circuit components 26 and auxiliary-fluid circuit components 31) is, e.g., 60-100 cm, the width of the openings 29, 30 is, e.g., 60-150 cm, and the depth of the bays 17, 23 is, e.g., 40-60 cm. It is understood that these dimensions are only given by way of example and can be modified according to the requirements.

The disclosed subject matter is not limited to the embodiments shown but includes all variants, modifications and combinations thereof that fall within the scope of the accompanying claims.

What is claimed is:

1. A transportable filling station for pressurized fluids, comprising:

a first container configured to be placed on the ground with a front side, a rear side, two lateral sides and a pressurized-fluid dispenser configured to be connected to an external pressurized fluid supply via fluid circuit components configured to be controlled by an electric control, wherein the first container includes a first wall-like support structure parallel to the rear side and a second wall-like support structure parallel to the front side, wherein the first and second wall-like support structures form a passage therebetween which passes through the first container and is configured to be entered by persons and through which ambient air can flow freely via openings in the lateral sides, and wherein at least one of the first or second wall-like support structures supports, facing the passage, the fluid circuit components and the second wall-like support structure supports, facing away from the passage, the pressurized-fluid dispenser.

2. The filling station according to claim 1, wherein each lateral side has an opening which is as wide as the passage at that lateral side.

3. The filling station according to claim 2, wherein the openings are provided with barrier grilles.

4. The filling station according to claim 1, wherein the first wall-like support structure is set back relative to the rear side into the interior of the first container to form a first bay accessible from the rear side for accommodating the electric control.

5. The filling station according to claim 4, wherein the first bay is closed to the first wall-like support structure by a separating wall.

6. The filling station according to claim 1, wherein the second wall-like support structure is set back relative to the front side into the interior of the first container to form a second bay accessible from the front side for accommodating the pressurized-fluid dispenser.

7. The filling station according to claim 1, wherein the second wall-like support structure supports, facing away from the passage, an electric control panel for operating the electric control and supports, facing the passage, auxiliary-fluid circuit components for the pressurized-fluid dispenser.

8. The filling station according to claim 1, comprising an external pressurized fluid supply connected to the fluid circuit components in fluid communication, the external pressurized fluid supply having a storage module for pressurized fluid and a compressor module for pressurising the pressurized fluid, wherein the compressor module is controlled by the electric control of the first container.

9. The filling station according to claim 8, wherein the compressor module is arranged in a second container configured to be placed on the ground.

10. The filling station according to claim 8, wherein the storage module is arranged in a third container configured to be placed on the ground or on a tank wagon.

* * * * *